United States Patent [19]
Robinson et al.

[11] Patent Number: 6,085,877
[45] Date of Patent: Jul. 11, 2000

[54] BI-DIRECTIONAL MULTIPLE STATE SUSPENSION DAMPER

[75] Inventors: Steven Ray Robinson, Franklin; James Louis Lopez, Jr.; Donelle Robert Mills, both of Dayton; Gary Lee Johnston, Pleasant Hill; Richard Edward Longhouse, Dayton; Michael Leslie Oliver, Xenia, all of Ohio

[73] Assignee: General Motors Corporation, Detroit, Mich.

[21] Appl. No.: 09/105,334

[22] Filed: Jun. 26, 1998

[51] Int. Cl.⁷ .................................................. F16F 9/34
[52] U.S. Cl. ........................... 188/322.15; 188/322.13; 188/317
[58] Field of Search ............... 188/322.13, 322.15, 188/320, 299.1, 319.1, 317, 318, 280

[56] References Cited

U.S. PATENT DOCUMENTS

| | | | |
|---|---|---|---|
| 4,749,068 | 6/1988 | Sirven | 188/322.15 |
| 5,139,119 | 8/1992 | Karnopp | 188/299 |
| 5,150,775 | 9/1992 | Charles et al. | 188/315 |
| 5,409,088 | 4/1995 | Sonsterod | 188/299 |
| 5,690,195 | 11/1997 | Kruckemeyer et al. | 188/299 |

FOREIGN PATENT DOCUMENTS 2164723  3/1986  United Kingdom.

*Primary Examiner*—Robert J Oberleitner
*Assistant Examiner*—Devon Kramer
*Attorney, Agent, or Firm*—Robert M. Sigler

[57] ABSTRACT

A damper provides tunable variable rates in both extension and compression operation. A piston is carried in a cylinder tube separating out extension and compression chambers. The piston carries a first valving assembly that is tuned to provide a first damping level when fluid flows through the piston from the extension chamber to the compression chamber and a second valving assembly that is tuned to provide a second damping level when fluid flows through the piston from the compression chamber to the extension chamber. A control valve assembly is mounted to move with the piston. When the control valve assembly is closed, fluid flow between the compression and extension chamber flows substantially only through the first and second valving assemblies and when the control valve is open at least some fluid flows between the compression and extension chambers through a secondary valve assembly without passing through the first and second valving assemblies. The secondary valve assembly is mounted to move with the piston and includes a third valving assembly that is tuned to provide a third damping level, and includes a fourth valving assembly that is tuned to provide a fourth damping level. When the control valve is open, fluid flow from the extension chamber to the compression chamber passes through both the first valving assembly and the third valving assembly wherein performance of the damper is determined by the first and third valving assemblies in parallel, and fluid flow from the compression chamber to the extension chamber passes through both the second valving assembly and the fourth valving assembly wherein performance of the damper is determined by the second and fourth valving assemblies in parallel.

10 Claims, 2 Drawing Sheets

BI-DIRECTIONAL MULTIPLE STATE SUSPENSION DAMPER

TECHNICAL FIELD

The present invention relates to a bidirectional multiple state suspension damper and more particularly, to a twin-tube suspension damper that carries a bidirectional control valve in the piston rod to provide real time control of damping forces in both compression and rebound directions through the use of parallel damping flow paths where damping rate is primarily a function of the deflective valve characteristics.

BACKGROUND OF THE INVENTION

Conventional vehicle suspension dampers typically consist of direct double-acting telescopic hydraulic passive valved devices. They are generally described as either shock absorbers or struts. A primary purpose of shock absorbers is to dampen oscillations of the vehicle suspension spring. This is accomplished by converting kinetic energy in the form of motion between sprung and unsprung masses of a vehicle into heat and then dissipating the heat. Struts also serve this capacity and in addition, support reaction and side-load forces on the suspension. These typical dampers are hydraulic devices using oil as the medium for dissipating energy. As the damper is cycled, a piston is forced to move in extension and compression directions through the oil that is contained within a cylinder tube. This creates pressure within a portion of the cylinder tube and a consequent pressure drop across the piston. During an extension stroke, high pressure is created in the extension chamber of the cylinder tube above the piston, forcing oil to flow through the piston's valving. During a compression stroke, high pressure is created in the compression chamber of the cylinder tube below the piston, forcing oil to flow back through the piston's valving. As the piston moves an additional amount of oil substantially equal to the volume of the piston rod entering or exiting the cylinder tube is forced through the piston valving or through a valve at the base of the cylinder tube in combination with the piston valving in compensation. It is well known that during a compression stroke of a twin-tube damper, fluid is forced through the base valve into the reservoir to compensate for an increasing volume of piston rod entering the cylinder tube. During an extension stroke fluid passes back across the base valve from the reservoir to the compression chamber to compensate for rod volume leaving the cylinder tube. As oil is forced to flow through the orifices in the piston valve and/or the base valve the pressure drop effects an energy conversion and the oil is heated. Through this mechanism dampers dissipate energy stored by the vehicle's suspension springs. The extent to which the oil is heated and consequently, the amount of energy dissipated is controlled by the size of the orifices in the valving and the amount of flow forced through the valving.

Damping force is a common measurement of the performance of a damper. It is used to quantify the amount of spring control provided by a damper. Passive dampers are tuned to provide selected vehicle performance characteristics. Because passive dampers provide a set damping force they are generally somewhat of a compromise in providing optimum damping performance over a wide range of operating conditions. The concept of dampers with an electrically controlled damping rate has been developed in the art wherein an algorithm is used to provide a control mechanism as a means of varying the damping force provided by a damper. This is often achieved by varying the valving orifices in response to various sensors which are used to detect current real world vehicle operating conditions. Such dampers adjust the damping force in response to the control mechanism so that various performance characteristics can be provided by an individual damper. A controllable orifice can readily vary the energy dissipation rate, but provides less than ideal levels of control, particularly at low flow rates.

Electrically controlled hydraulic dampers for vehicle suspension systems are in general, known in the art. However, their actual wide-spread application and use has been somewhat of a recent phenomenon. Their use enables providing manually selectable damper performance characteristics and electronically controlled damper performance characteristics. Preferably, control is provided in both the compression and extension directed operation of the damper. Providing this level of control in an efficiently packaged and competitive manner is a significant challenge.

SUMMARY OF THE INVENTION

According to an aspect of the present invention a damper with continuously variable rates in both extension and compression operation is provided. The damper includes a tube carrying an engaging piston separating the tube into extension and compression chambers. The piston is positioned on a piston rod and is movable in both extension and compression directions in response to suspension operation of an associated vehicle. A particular passive damping rate is provided by fluid flow through the piston's valve set during movement. A bidirectional control valve is carried by the piston rod. The control valve provides a selective opening to divert variable amounts of fluid flow away from the piston's valving. The diverted fluid flow is directed through a secondary set of valves that provide a unique passive damping rate. The effective damping rate of the damper is determined by the amount of fluid flow that is diverted to the secondary valving. This amount is variable in response to vehicle driving conditions to provide a preferred damping rate.

According to a preferred embodiment of the present invention, when the piston moves in an extension direction, fluid in the damper is moved to flow through the piston from the extension chamber to the compression chamber. When the control valve is closed, fluid flow through the secondary valving is prevented. When opened, the control valve provides variably controllable fluid flow from the extension chamber to the compression chamber. The flow rate is controlled by the amount and rate at which the control valve opens. The performance affecting characteristics of the secondary valving are tuned differently than those of the piston valving so that a different level of damping occurs. The damping characteristic of the damper is determined solely by the passive deflective characteristic built into the piston valving when the control valve is closed, and is determined by the deflective characteristics of the secondary valving in parallel with the piston valving when the control valve is open.

In a manner similar to the operation in extension, when the piston moves in a compression direction, fluid in the damper is moved to flow from the compression chamber to the extension chamber. When the control valve is closed, all of the flow is directed through the damper valve so that the performance characteristics of the damper are determined solely by the passive deflective characteristics of the piston valving. When the control valve is opened, variably controllable fluid flow is provided to the secondary valving from the compression chamber to the extension chamber.

According to a preferred embodiment of the present invention described in greater detail herein, a damper provides tunable variable rates in both extension and compression operation. A piston is carried in a cylinder tube separating out extension and compression chambers. The piston carries a first valving assembly that is tuned to provide a first damping level when fluid flows through the piston from the extension chamber to the compression chamber and a second valving assembly that is tuned to provide a second damping level when the fluid flows through the piston from the compression chamber to the extension chamber. A control valve assembly is mounted to move with the piston. When the control valve assembly is closed, fluid flow between the compression and extension chamber flows substantially only through the first and second valving assemblies and when the control valve is open at least some fluid flows between the compression and extension chambers through a secondary valve assembly without passing through the first and second valving assemblies. The secondary valve assembly is also mounted to move with the piston, includes a third valving assembly that is tuned to provide a third damping level, and includes a fourth valving assembly that is tuned to provide a fourth damping level. When the control valve is open fluid flow from the extension chamber to the compression chamber passes through both the first valving assembly and the third valving assembly wherein performance of the damper is determined by the first and third valving assemblies in parallel, and fluid flow from the compression chamber to the extension chamber passes through both the second valving assembly and the fourth valving assembly wherein performance of the damper is determined by the second and fourth valving assemblies in parallel.

BRIEF DESCRIPTION OF THE DRAWINGS

The present invention will now be described, by way of example, with reference to the accompanying drawings in which.

DESCRIPTION OF THE PREFERRED EMBODIMENT

Figure 1:
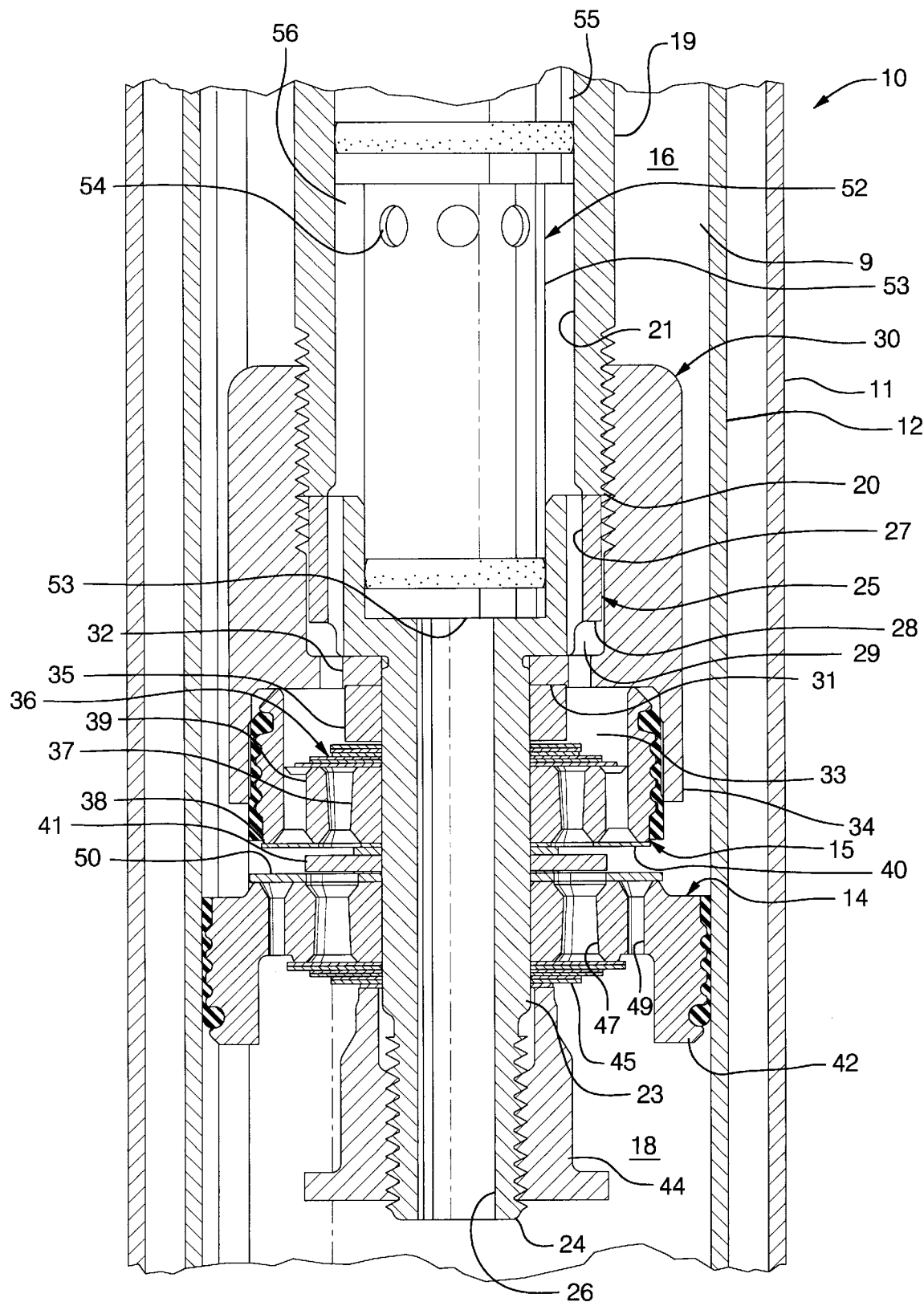
FIG. 1 is a fragmentary cross sectional illustration of a vehicle suspension damper.

Referring to the drawings, illustrated in FIG. 1 is that part of a twintube damper 10 which is most pertinent to the present invention. Damper 10 includes a reservoir tube 11 enclosing a cylinder tube 12, which together carry a supply of fluid (not illustrated), that serves as a damping medium providing damping control between sprung and unsprung masses (not illustrated), of an associated vehicle. A reservoir 9 is defined between the reservoir tube 11 and the cylinder tube 12. Slidably carried within cylinder tube 12 is piston assembly 14 that separates the cylinder tube into extension chamber 16 and compression chamber 18. The piston assembly 14 reciprocates within the cylinder tube 12 in an often erratic manner of varying magnitude in response to road inputs. The resistance encountered as the piston assembly 14 moves through the fluid filled tube determines the damping characteristic interposed into the suspension system to dampen spring oscillation. Since the road inputs vary greatly depending on the condition of the surface encountered, it is preferable if more than one damping characteristic is available in the damper 10. Therefore, a secondary valving assembly 15 is carried near the piston assembly 14 and in general, provides an optional flow path between the extension chamber 16 and the compression chamber 18.

Figure 2:
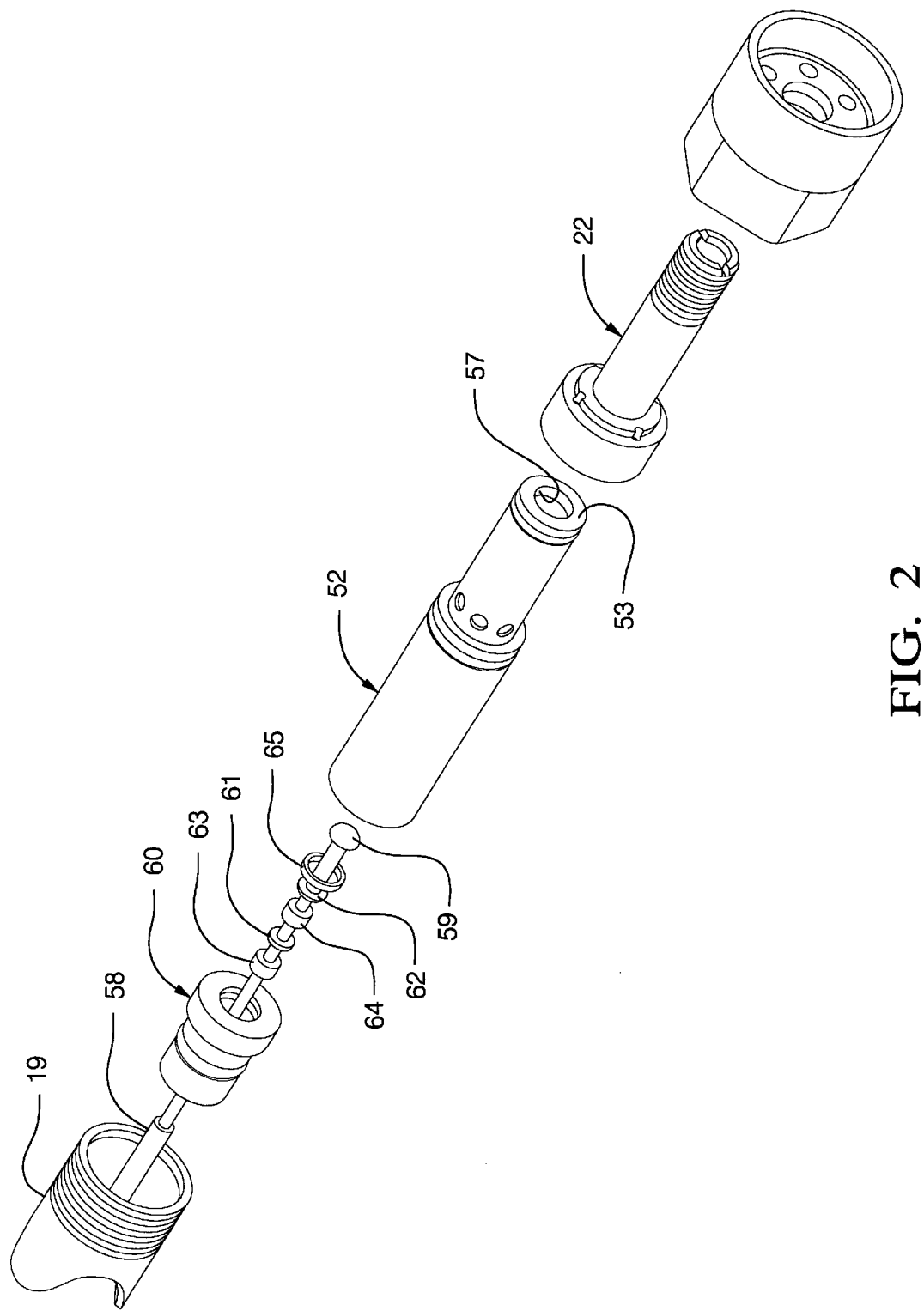
FIG. 2 is a perspective partially exploded view of the control valving of the damper shown in FIG. 1.

With greater specificity, the damper 10 includes a piston rod 19 that extends into the cylinder tube 12 and terminates with a threaded end 20. Piston rod 19 includes a hollow interior for at least a portion of its length that is defined by a bore 21 that opens through the threaded end 20. A piston tenon 22 abuts against the threaded end 20 so that any compressive loads exerted on the piston tenon 22 are transferred through the piston rod 19. The piston tenon 22 includes a cylindrical body 23 that terminates at a threaded end 24, and includes an enlarged head 25 that engages the threaded end 20 of piston rod 19. As shown in FIG. 2 the cylindrical body 23 and enlarged head 25 are formed as one piece so that the piston tenon 22 is of an integral unitary construction. A central opening 26 extends completely through the piston tenon 22 opening into the compression chamber 18 and opening at the threaded end 20 of piston rod 19. A plurality of reverse openings 27 extend through the head 25 and are arranged around the central opening 26 extending substantially parallel therewith. An annular step 28 is formed in the head 25 of piston tenon 22 forming an annular chamber 29 adjacent the reverse openings 27. The piston tenon 22 is held against the piston rod 19 by a retainer 30 that is threaded onto the threaded end 20. Retainer 30 includes a wall 31 that receives the cylindrical body 23 and engages the head 25 holding it against the terminal end 20. Retainer 30 includes a plurality of openings 32 that are oriented parallel to the central opening 26 and that register with the annular chamber 29, with alignment between the openings 32 and the reverse openings 27 being noncritical since flow registry between the two is ensured via the annular chamber 29. The openings 32 also register with a chamber 33 that is defined between an annular wall 34 of retainer 30 and the cylindrical body 23 of the piston tenon 22. The secondary valve assembly 15 is received within the annular wall 34 with a fluid-tight seal positioned thereagainst and is spaced away from the wall 31 by a spacer 35. Secondary valve assembly 15 includes a deflected disc valve stack 36 that normally closes openings 37 of valve body 38 while providing a continuous fluid communication route between openings 39 and the chamber 33. Similarly the deflected disc valve stack 40 normally closes the openings 39 while providing a continuous fluid communication route between the openings 37 and the extension chamber 16.

The piston assembly 14 is carried on the cylindrical body 23 and is spaced away from the secondary valve assembly 15 by a spacer 41. Piston assembly 14 includes piston body 42 which is seated against the cylinder tube 12 and is maintained in position on the piston tenon 22 by a nut 44 that engages the threaded end 24. A deflected disc valve stack 45 normally closes the openings 47 in piston body 42 while providing a continuous fluid communication route between the openings 49 and the compression chamber 18. Similarly the deflected disc valve stack 50 normally closes the openings 49 while providing a continuous fluid communication route between the openings 47 and the extension chamber 16.

In a de-energized mode of operation of the damper 10, as the piston assembly 14 moves in an extension stroke increasing the size of the compression chamber 18 while simultaneously decreasing the size of the extension chamber 16, fluid is forced to move through the piston assembly 14 from the extension chamber 16 to the compression chamber 18. The fluid moves through access openings in the deflected disc stack 50 into the openings 47 forcing the deflected disc stack 45 to deflect, allowing fluid communication from the openings 47 to the compression chamber 18. During this mode of operation, the passive deflective characteristics of the disc stack 45 determined the performance characteristics of the damper 10 in an extension stroke. As this occurs an amount of the piston rod 19 is exiting the cylinder tube 12. To provide fluid makeup for this decrease of volume from the working chambers of the damper 10, fluid is drawn into the compression chamber 18 from the reservoir 9 in a manner that is well known in the art such as by providing a base valve assembly that permits fluid communication between the compression chamber 18 and the reservoir 9. During compression directed operation of the damper 10, the piston assembly 14 moves in a manner that decreases the size of the compression chamber 18 while simultaneously increasing the size of the extension chamber 16. As this occurs, fluid is forced to enter the openings 49 deflecting the disc stack 50 allowing fluid communication between the compression chamber 18 and the extension chamber 16.

During this mode of operation, the performance characteristics of the damper 10 are determined solely by the passive deflective characteristics of the disc stack 50. Fluid flow is prevented from moving through the secondary valve assembly 15 by the de-energized control valve assembly 52. The control valve assembly 52 has a body that extends through the piston rod 19 and is sealingly engaged within an opening of the head 25 of piston tenon 22. A flow opening is provided in the end 53 of the control valve assembly 52 and a plurality of openings 54 are provided to the chamber 54 within the piston rod 19. Control valve assembly 52 also includes a head 55 that is sealingly engaged with the piston rod 19.

Referring to FIG. 2, the control valve assembly 52 is further illustrated and the opening 57 in the end 53 is clearly visible. When the control valve assembly 52 is energized to an open condition fluid communication is permitted between the opening 57 and the openings 54 to a varying degree in either direction. This provides an open fluid flow path from the chamber 33 adjacent the secondary valve assembly 15 and the compression chamber 18. The path extends from the chamber 33 through the openings 32, the annular chamber 29, the reverse openings 27, the chamber 56, openings 54, the control valve assembly 52, the opening 57 in end 53 and the central opening 26. With the control valve assembly 52 energized, an alternate parallel flow path is provided between the extension chamber 16 and the compression chamber 18 through the secondary valve assembly 15. Therefore, when the piston assembly 14 moves in an extension directed travel, fluid can flow from the extension chamber 16 to the compression chamber 18 through the valving of the piston assembly 14 or through the valving of the secondary valve assembly 15. Fluid flow through the secondary valve assembly 15 extends through the access openings of the deflected disc stack 40 and the openings 37 deflecting the disc stack 36 permitting fluid communication into the chamber 33 and on to the compression chamber 18.

During this mode of operation the performance characteristics of the damper 10 are determined by both the passive deflective characteristics of the disc stack 45 and the passive deflective characteristics of the disc stack 36, which is in series with the opening of the control valve assembly 52. In the present embodiment, the deflective characteristics of the disc stack 36 are significantly lighter than those of the disc stack 45 so that upon the opening of the control valve assembly 52, a softer ride or lower damping rate performance characteristic is provided by the damper 10. Similarly, when the piston 14 moves in compression directed travel, fluid flows from the compression chamber 18 to the extension chamber 16 through the piston assembly 14 or through the secondary valve assembly 15. Fluid flowing through the secondary valve assembly 15 accesses the chamber 33 through the control valve assembly 52 and enters the openings 39 deflecting the disc stack 40 and entering the extension chamber 16. In this mode of operation, the performance characteristics of the damper 10 are defined by both the passive deflective characteristics of the disc stack 50 and the passive deflective characteristics of the disc stack 40, which is in series with the opening of the control valve 52. In the present embodiment the deflective characteristics of the disc stack 40 are lighter than those of the disc stack 50 so that when the control valve 52 is open a softer ride or a lower damping rate performance characteristic is provided by the damper 10.

Referring again to FIG. 2, the assembly of the control valve 52 within the piston rod 19 and piston tenon 22 is illustrated. An insulated conductor 58 extends through the piston rod 19 and engages the control valve assembly 52 for remote operation thereof. The conductor 58 includes a terminal end 59 that engages the control valve assembly 52 with the terminal end 59 maintained in position within the piston rod 19 by a seal plug 60 that is fixed within the piston rod 19 and that receives the combination of dual seals 61 and 62 that are received against supports 63 and 64 respectively. An insulator 65 surrounds the terminal end 59 and is also received within the seal plug 60. The seal plug 60 prevents damper fluid from leaking along the inner surface of the piston rod 19 and insures a tight seal around the conductor 58. Preferably the conductor 58 in combination with the piston rod 19 provide a means of communication to a remote electronic control unit (not illustrated) that operates control valve 52 in a real time variable manner so that the performance of the damper 10 is adjustable to meet the driving conditions of the associated vehicle. Accordingly, the present invention provides a suspension damper with variable performance characteristics that is readily packaged within the strict confines of a vehicle suspension system.

What is claimed is:

1. A damper comprising:

a cylinder tube;

a piston slidably carried in the cylinder tube engaging the cylinder tube separating the cylinder tube into extension and compression chambers wherein the piston carries a first valving assembly that is tuned to provide a first damping level when a fluid carried in the cylinder tube flows through the piston from the extension chamber to the compression chamber, wherein the piston carries a second valving assembly that is tuned to provide a second damping level when the fluid flows through the piston from the compression chamber to the extension chamber;

a control valve assembly mounted to move with the piston, wherein when the control valve assembly is closed, fluid flow between the compression and extension chambers passes substantially only through the first and second valving assemblies and when the control valve is open at least some fluid flow passes between the compression and extension chambers without passing through the first and second valving assemblies; and a secondary valve assembly mounted to move with the piston wherein the secondary valve assembly includes a third valving assembly that is tuned to provide a third damping level and fourth valving assembly that is tuned to provide a fourth damping level wherein when the control valve is open, fluid flow from the extension chamber to the compression chamber passes through both the first valving assembly and the third valving assembly, wherein a damping characteristic of the damper is determined by the first and third valving assemblies in parallel, and fluid flow from the compression chamber to the extension chamber passes through both the second valving assembly and the fourth valving assembly wherein the damping characteristic of the damper is determined by the second and fourth valving assemblies in parallel.

2. A damper according to claim 1 further comprising a piston tenon that includes a central opening and includes a plurality of reverse openings aligned substantially parallel to the central opening wherein the piston and the secondary valve assembly are both mounted on the piston tenon so that the central opening extends through the piston and the secondary valve assembly and wherein when the control valve is open, fluid flows through the central opening in a first direction and through the reverse openings in a second direction that is opposite to the first direction.

3. A damper according to claim 2 further comprising a piston rod and a retainer securing the piston tenon to the piston rod wherein the retainer includes a plurality of retainer openings that are aligned substantially parallel with the central opening and wherein fluid flows through the retainer openings in the second direction.

4. A damper according to claim 3 wherein the control valve is carried substantially in the piston rod and is engaged with the piston retainer.

5. A damper according to claim 4 wherein fluid flows through the piston in the first direction and fluid flows through the secondary piston in the second direction.

6. A suspension damper operable in both extension and compression strokes at variable damping rates comprising:
   a cylinder tube;
   a piston rod partly disposed in the cylinder tube;
   a piston tenon;
   a piston secured on the piston tenon and separating the cylinder tube into extension and compression chambers, and being movable in an extension direction and a compression direction during a corresponding extension and compression stroke of the damper wherein the piston includes a first valving assembly that is tuned to provide a first damping level when a fluid carried in the cylinder tube flows through the piston from the extension chamber to the compression chamber, wherein the piston carries a second valving assembly that is tuned to provide a second damping level when the fluid flows through the piston from the compression chamber to the extension chamber;
   a secondary valve assembly carried on the piston tenon and including a third valving assembly that is tuned to provide a third damping level and a fourth valving assembly that is tuned to provide a fourth damping level; and
   a control valve carried substantially in the piston rod wherein when the control valve assembly is closed, fluid flow between the compression and extension chamber passes substantially only through the first and second valving assemblies and when the control valve is open fluid flow from the extension chamber to the compression chamber passes through both the first valving assembly and the third valving assembly wherein a damping characteristic of the damper is determined by the first and third valving assemblies in parallel, and fluid flow from the compression chamber to the extension chamber passes through both the second valving assembly and the fourth valving assembly wherein the damping characteristic of the damper is determined by the second and fourth valving assemblies in parallel.

7. A suspension damper according to claim 6 wherein the secondary valve assembly is positioned between the piston and the control valve.

8. A suspension damper according to claim 7 wherein the piston tenon includes a central opening that opens to the compression chamber and to the control valve wherein fluid flow between the compression chamber and the control valve flows past the piston and the secondary valve assembly through the piston tenon.

9. A suspension damper operable in both extension and compression strokes at continuously variable damping rates comprising:
   a reservoir tube;
   a cylinder tube disposed within the reservoir tube;
   a piston rod partly disposed in the cylinder tube and slidable within the cylinder tube;
   a piston tenon movable in the cylinder tube in concert with the piston rod;
   a piston secured on the piston tenon and separating the cylinder tube into extension and compression chambers, and being movable in an extension direction and a compression direction during a corresponding extension and compression stroke of the damper, wherein the piston includes a first valving assembly that is tuned to provide a first damping level when a fluid carried in the cylinder tube flows through the piston from the extension chamber to the compression chamber, wherein the piston carries a second valving assembly that is tuned to provide a second damping level when the fluid flows through the piston from the compression chamber to the extension chamber;
   a secondary valve assembly carried on the piston tenon and including a third valving assembly that is tuned to provide a third damping level and a fourth valving assembly that is tuned to provide a fourth damping level; and
   a control valve carried substantially in the piston rod wherein when the control valve assembly is closed, fluid flow between the compression and extension chamber passes substantially only through the first and second valving assemblies and when the control valve is open, fluid flow from the extension chamber to the compression chamber passes through both the first valving assembly and the third valving assembly wherein a damping characteristic of the damper is determined by the first and third valving assemblies in parallel, and fluid flow from the compression chamber to the extension chamber passes through both the second valving assembly and the fourth valving assembly wherein the damping characteristic of the damper is determined by the second and fourth valving assemblies in parallel.

10. A suspension damper according to claim 9 further comprising a seal plug positioned in the piston rod adjacent the control valve and a conductor passing through the seal plug and engaging the control valve wherein the seal plug has an outer surface engaging a first seal and an inner opening receiving a second seal with the conductor extending through the second seal.

* * * * *